(12) United States Patent
Chiakpo et al.

(10) Patent No.: US 8,121,363 B2
(45) Date of Patent: Feb. 21, 2012

(54) THERMOGRAPHIC IMAGE PROCESSING SYSTEM

(75) Inventors: Ndubuisi Chiakpo, Lexington, MA (US); Karl J. Duvalsaint, Lagrangeville, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/137,837

(22) Filed: Jun. 12, 2008

(65) Prior Publication Data

US 2009/0310815 A1  Dec. 17, 2009

(51) Int. Cl.
*G06K 9/54* (2006.01)
(52) U.S. Cl. .......................... 382/128; 382/305
(58) Field of Classification Search .................. 382/128, 382/305
See application file for complete search history.

(56) References Cited

U.S. PATENT DOCUMENTS

| | | | |
|---|---|---|---|
| 5,721,883 A | 2/1998 | Katsuo et al. | |
| 6,023,637 A * | 2/2000 | Liu et al. | 600/474 |
| 6,215,898 B1 | 4/2001 | Woodfill et al. | |
| 6,404,902 B1 | 6/2002 | Takano et al. | |
| 6,456,737 B1 | 9/2002 | Woodfill et al. | |
| 6,567,622 B2 | 5/2003 | Phillips | |
| 6,661,931 B1 | 12/2003 | Kawada | |
| 6,744,931 B2 | 6/2004 | Komiya et al. | |
| 6,829,378 B2 | 12/2004 | DiFilippo et al. | |
| 7,095,882 B2 | 8/2006 | Akahori | |
| 7,102,777 B2 | 9/2006 | Haraguchi | |
| 7,142,725 B2 | 11/2006 | Komiya et al. | |
| 2002/0164059 A1 | 11/2002 | DiFilippo et al. | |
| 2002/0198371 A1 | 12/2002 | Wang | |
| 2003/0031355 A1 | 2/2003 | Nagatsuka | |
| 2003/0113034 A1 | 6/2003 | Komiya et al. | |
| 2004/0062454 A1 | 4/2004 | Komiya et al. | |
| 2004/0091243 A1 | 5/2004 | Theriault et al. | |
| 2004/0156546 A1 | 8/2004 | Kloth | |
| 2004/0186371 A1 | 9/2004 | Toda | |
| 2004/0217956 A1 | 11/2004 | Besl et al. | |
| 2005/0083338 A1 | 4/2005 | Yun et al. | |
| 2005/0263678 A1 | 12/2005 | Arakawa | |
| 2006/0013473 A1 | 1/2006 | Woodfill et al. | |
| 2006/0250514 A1 | 11/2006 | Inoue et al. | |
| 2006/0268357 A1 | 11/2006 | Vook et al. | |
| 2007/0159642 A1 | 7/2007 | Choi | |

\* cited by examiner

*Primary Examiner* — W. B. Perkey
(74) *Attorney, Agent, or Firm* — William E. Schiesser; Ronald A. D'Alesandro; Keohane & D'Alessandro PLLC

(57) ABSTRACT

The system permits sharing both thermographic image processing and visualization across a single universal platform, thus allowing for sharing of processor resources and visualization of thermographic images on a variety of imaging (client) devices without high-performance graphical display cards. In a typical embodiment, a (e.g., medical) thermographic image 2D linear registration algorithm is implemented on a Cell Broadband Engine processor, which has nine processor cores on a chip and has a 4-way SIMD unit for each core. This multi-core processor technological advancement allows for the development of a thermographic image processing system that is used for thermographic image capturing modalities. A platform is used to provide a generalized medical thermographic image capturing and processing system, which handles different types of medical thermographic image apparatuses on a single data processing platform.

20 Claims, 6 Drawing Sheets

THERMOGRAPHIC IMAGE PROCESSING SYSTEM

CROSS-REFERENCE TO RELATED APPLICATIONS

This application is related in some aspects to commonly owned and co-pending patent application Ser. No. 11/668,875, entitled "UNIVERSAL IMAGE PROCESSING", filed Jan. 30, 2007, the entire contents of which are herein incorporated by reference. This application is also related in some aspects to commonly owned and co-pending application Ser. No. 11/782,170, entitled "HYBRID MEDICAL IMAGE PROCESSING", filed Jul. 24, 2007, the entire contents of which are herein incorporated by reference. This application is also related in some aspects to commonly owned and co-pending application Ser. No. 11/738,723, entitled "HETEROGENEOUS IMAGE PROCESSING SYSTEM", filed Apr. 23, 2007, the entire contents of which are herein incorporated by reference. This application is also related in some aspects to commonly owned and co-pending application Ser. No. 11/767,728, entitled "HYBRID IMAGE PROCESSING SYSTEM", filed Jun. 25, 2007, the entire contents of which are herein incorporated by reference. This application is also related in some aspects to commonly owned and co-pending application Ser. No. 11/877,926, entitled "HIGH BANDWIDTH IMAGE PROCESSING SYSTEM", filed Oct. 24, 2007, the entire contents of which are herein incorporated by reference.

FIELD OF THE INVENTION

In general, the present invention relates to thermographic image processing/inspection. Specifically, the present invention relates to a high performance thermographic image processing system that permits sharing of both thermographic image processing and visualization across a single, universal platform.

Infrared thermography, thermographic imaging, and/or thermographic video, is a type of infrared imaging science. Thermographic cameras detect radiation in the infrared range of the electromagnetic spectrum (roughly 900-14,000 nanometers or 0.9-14 μm) and produce thermographic images of that radiation. Since infrared radiation is emitted by all objects based on their temperatures, according to the black body radiation law, thermography makes it possible to "see" one's environment with or without visible illumination. The amount of radiation emitted by an object increases with temperature, therefore thermography allows one to see variations in temperature (hence the name). When viewed by thermographic camera, warm objects stand out well against cooler backgrounds; humans and other warm-blooded animals become easily visible against the environment, day or night. As a result, thermography's extensive use can historically be ascribed to the military and security services.

Thermographic imaging photography also has many other uses. For example, firefighters use it to see through smoke, find persons, and localize the base of a fire. With thermographic imaging, power lines maintenance technicians locate overheating joints and parts, a telltale sign of their failure, to eliminate potential hazards. Where thermographic insulation becomes faulty, building construction technicians can see heat leaks to improve the efficiencies of cooling or heating air-conditioning. Thermographic imaging cameras are also installed in some luxury cars to aid the driver. Some physiological activities, particularly responses, in human beings and other warm-blooded animals can also be monitored with thermographic imaging.

Current visual inspection systems are typically PC-based and are capable of storing many thermographic images. Unfortunately, existing systems not only lack ideal speed for viewing thermographic images, but are also limited to local viewing. In view of the foregoing, there exists a need for a solution that solves at least one of the above-referenced deficiencies in the related art.

SUMMARY OF THE INVENTION

The system permits sharing both thermographic image processing and visualization across a single universal platform, thus allowing for sharing of processor resources and visualization of thermographic images on a variety of imaging (client) devices without high-performance graphical display cards. In a typical embodiment, a (e.g., medical) thermographic image 2D linear registration algorithm is implemented on a Cell Broadband Engine processor, which has nine processor cores on a chip and has a 4-way SIMD unit for each core. This multi-core processor technological advancement allows for the development of a thermographic image processing system that is used for thermographic image capturing modalities. A platform is used to provide a generalized medical thermographic image capturing and processing system, which handles different types of medical thermographic image apparatuses on a single data processing platform.

A first aspect of the present invention provides a method for processing thermographic images, comprising: receiving a query corresponding to a set of thermographic images; receiving a request for at least one of the set of thermographic images, the request being based on results of the query; retrieving thermographic image data corresponding to the at least one of the set of thermographic images from storage in response to the request; processing the thermographic image data with a thermographic image processor; and returning a response to the request, the response being based on the thermographic image data after the thermographic image data has been processed.

A second aspect of the present invention provides a system for processing thermographic images, comprising: a module for receiving a query corresponding to a set of thermographic images; a module for receiving a request for at least one of the set of thermographic images, the request being based on results of the query; a module for retrieving thermographic image data corresponding to the at least one of the set of thermographic images from storage in response to the request; a module for processing the thermographic image data with a thermographic image processor; and a module for returning a response to the request, the response being based on the thermographic image data after the thermographic image data has been processed.

A third aspect of the present invention provides at least one computer readable medium containing at least one program product for processing thermographic images, the at least one computer readable medium comprising program code for causing at least one computer system to: receive a query corresponding to a set of thermographic images; receive a request for at least one of the set of thermographic images, the request being based on results of the query; retrieve thermographic image data corresponding to the at least one of the set of thermographic images from storage in response to the request; process the thermographic image data with a thermographic image processor; and return a response to the request, the response being based on the thermographic image data after the thermographic image data has been processed.

A fourth aspect of the present invention provides a method for deploying at least one application for processing thermographic images, comprising; providing a computer infrastructure being operable to: receive a query corresponding to a set of thermographic images; receive a request for at least one of the set of thermographic images, the request being based on results of the query; retrieve thermographic image data corresponding to the at least one of the set of thermographic images from storage in response to the request; process the thermographic image data with a thermographic image processor; and return a response to the request, the response being based on the thermographic image data after the thermographic image data has been processed.

A fifth aspect of the invention provides at least one data processing system for providing for processing thermographic images, comprising: at least one memory medium having instructions; at least one bus coupled to the memory medium; and at least one processor coupled to the least one bus that when executing the instructions causes the at least one data processing system to: receive a query corresponding to a set of thermographic images; receive a request for at least one of the set of thermographic images, the request being based on results of the query; retrieve thermographic image data corresponding to the at least one of the set of thermographic images from storage in response to the request; process the thermographic image data with a thermographic image processor; and return a response to the request, the response being based on the thermographic image data after the thermographic image data has been processed.

A sixth aspect of the present invention provides a computer-implemented business method for processing thermographic images, comprising: receiving a query corresponding to a set of thermographic images; receiving a request for at least one of the set of thermographic images, the request being based on results of the query; retrieving thermographic image data corresponding to the at least one of the set of thermographic images from storage in response to the request; processing the thermographic image data with a thermographic image processor; and returning a response to the request, the response being based on the thermographic image data after the thermographic image data has been processed.

BRIEF DESCRIPTION OF THE DRAWINGS

These and other features of this invention will be more readily understood from the following detailed description of the various aspects of the invention taken in conjunction with the accompanying drawings in which.

Figure 1:
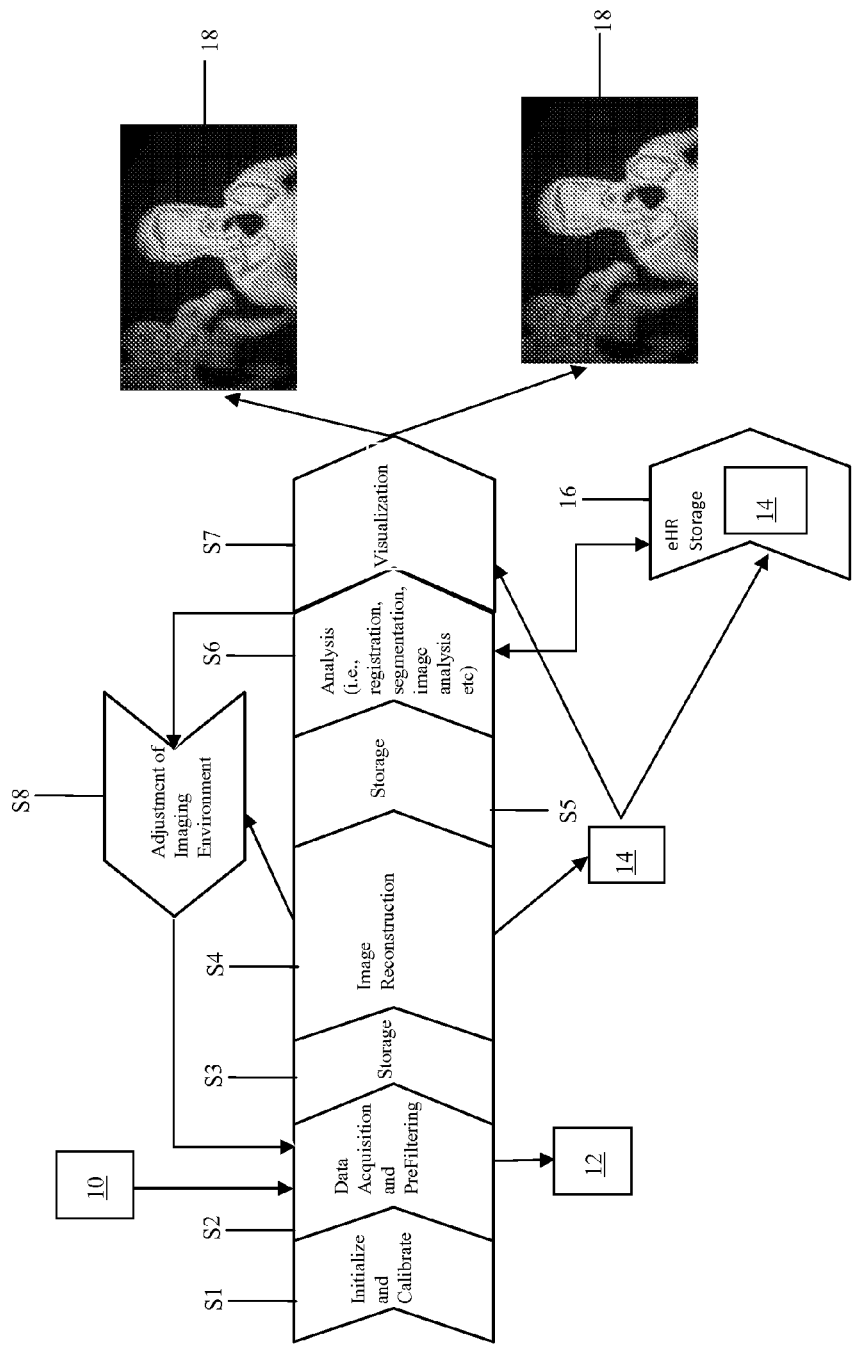
FIG. 1 shows a method flow diagram according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the system permits sharing both thermographic image processing and visualization across a single universal platform, thus allowing for sharing of processor resources and visualization of thermographic images on a variety of imaging (client) devices without high-performance graphical display cards. In a typical embodiment, a (e.g., medical) thermographic image 2D linear registration algorithm is implemented on a Cell Broadband Engine processor, which has nine processor cores on a chip and has a 4-way SIMD unit for each core. This multi-core processor technological advancement allows for the development of a thermographic image processing system that is used for thermographic image capturing modalities. A platform is used to provide a generalized thermal medical thermographic image capturing and processing system, which handles different types of thermal medical thermographic image apparatuses on a single data processing platform.

Medical thermography is a non-invasive, non-contact tool that uses the heat from a human body to aid in making diagnosis of a host of health care conditions. Thermography is completely safe and uses no radiation. This equipment usually has two parts, the IR camera and a standard computer station. Monitors are high-resolution full color, isotherm or grey scale, and usually include thermographic image manipulation, isothermal temperature mapping, and point-by-point temperature measurement with a cursor or statistical region of interest. For an example, the Infrared Imaging is based on the principle that metabolic activity and vascular circulation in both pre-cancerous tissue and the area surrounding a developing cancer is almost always higher than in normal tissue. This process frequently results in an increase in regional surface temperatures of the tissue and this data is used for diagnostic purposes. To improve the current design, the new design involves the multi-core thermographic image processor that handles the captured infrared camera, digitizing it into the data format, process captured process, storage as shown in the Figs below. This configuration will allow the thermographic technology to be integrated into a more complete medical thermographic image diagnostics system.

Referring now to FIG. 1, a flow chart according to the present invention is shown. In step S1, the system is initialized and calibrated. In step S2, thermographic image data 10 is received and processed (e.g., pre-filtered). In step S3, the processed thermographic image data 12 can be stored for the reconstruction that occurs in step S4. In step S5, the reconstructed thermographic image 20 can be stored (e.g., in storage unit 16) for analysis (e.g., registration, segmentation, etc.) in step S6 and visualization (displayed thermographic image 18) in step S7. As further shown, feedback can be used to adjust the imaging environment in step S8.

Figure 2:
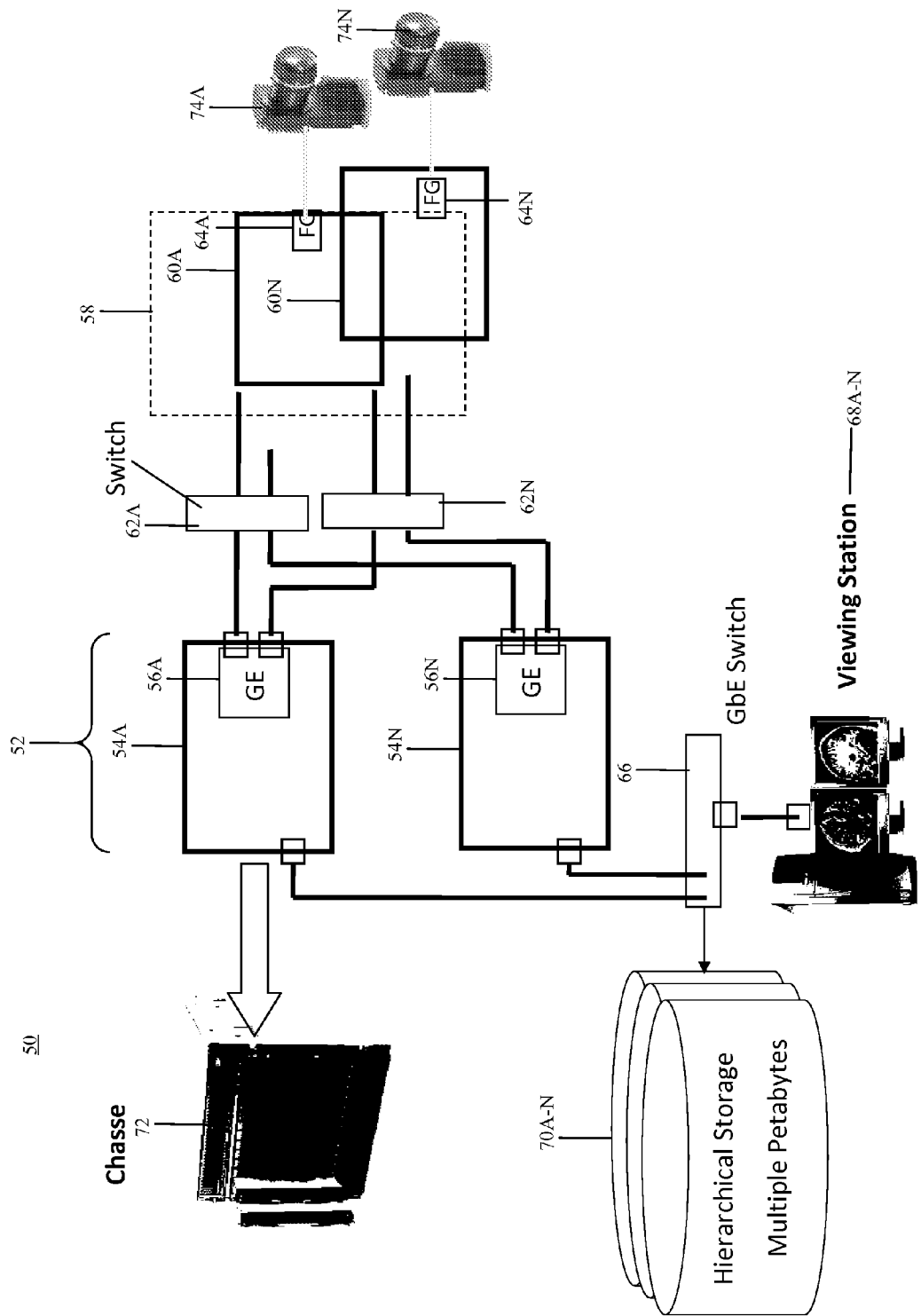
FIG. 2 shows a thermographic image processing system according to the present invention.

Referring now to FIG. 2, a detailed implementation of thermographic imaging system 50 is shown. As shown, thermographic imaging system 50 typically comprises thermographic image processing unit 52 that comprises a set (one or more) of thermographic image processors 54A-N (e.g., QS21 processors) and thermographic image interface unit 58 that comprises a set of computers 60A-N (e.g., workstations) that are interconnected over a network. Interconnectivity between thermographic image processing unit 52 and thermographic image interface unit 58 is provided via a set of communications switches 62A-B (e.g., InfiniBand) and communications card 56A-N. As further shown in FIG. 2, set of thermographic image processors 54A-N communicate with a set of viewing stations 68A-N and hierarchical storage units 70A-N via a switch 66 such as a Gigabit Ethernet (GbE) switch. Further set of thermographic image processors 54A-N can communicate with one or more other computing devices such as chasse 72.

In general, thermographic image grabbers 64A-N receive thermographic images from thermographic image recordation mechanisms 74A-N. The thermographic image data is sent to set of thermographic image processors 54A-N using commands from an IP command library. The communication will occur via sets of communications cards 56A-N and sets of communications switches 62A-N. Upon receiving the thermographic image data, thermographic image processing unit 52 will utilize commands from a special purpose engine library command library, and assign tasks to a set of thermographic processing engines (not shown) via a command dispatcher to process the thermographic image data based on the commands. Results (e.g., processed thermographic image data) will then be communicated to viewing stations 68A-N via along with commands for reconstructing the thermographic image data into thermographic image switch 66 via sets of communications cards 56A-N. Along these lines, thermographic image data, commands, processed thermographic image data and/or any other data types received or created under the present invention can be stored in hierarchical storage 70, chasse 72, etc. A more detailed diagram of thermographic image processing unit 52 and processors 54A-N can be found in FIG. 2 of the above-incorporated patent application having Ser. No. 11/767,728, entitled "Hybrid Thermographic image Processing System."

Figure 3:
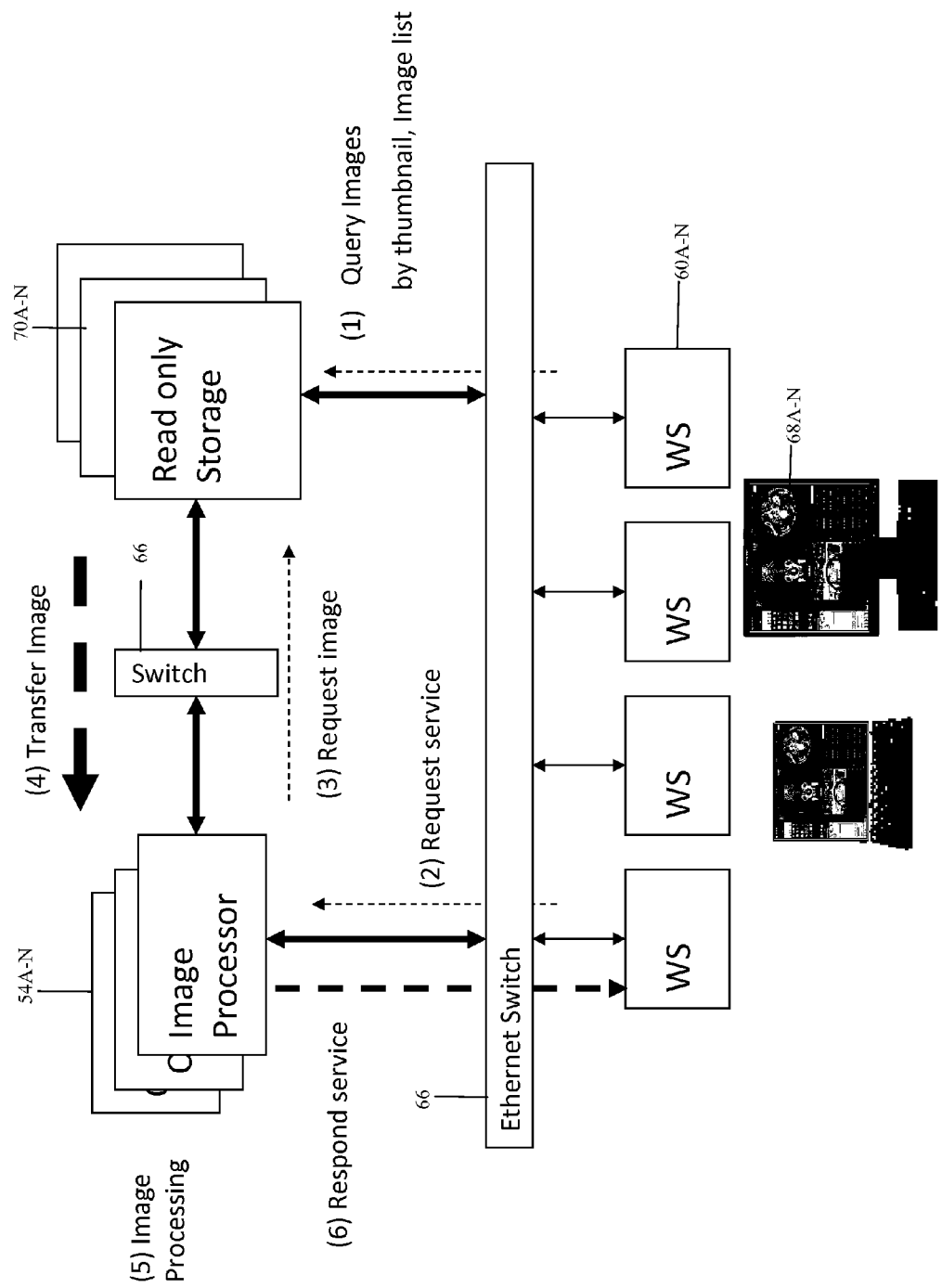
FIG. 3 shows a data flow according to the present invention.
Figure 4:
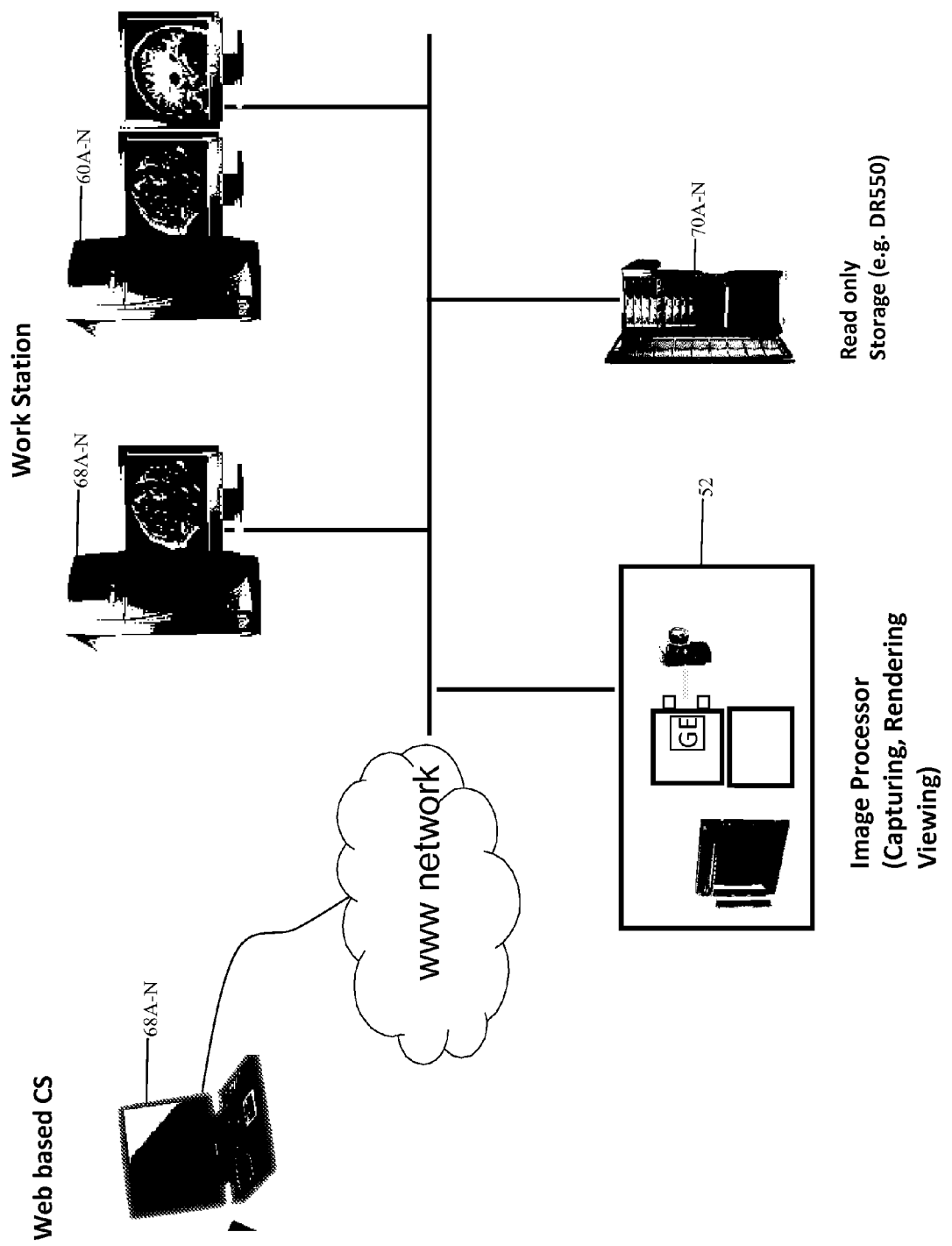
FIG. 4 shows a network according to the present invention.

Referring now to FIG. 3, a data flow according to the present invention is shown. Following the diagram in numerical order, a query is made to read-only storage unit 70A-N (via switch) for one or more thermographic images from computers 60A-B. Based thereon, a request is made to thermographic image processor 54A-N, which will request the same from read-only storage 70A-N. Upon receiving the thermographic images, set of thermographic image processors 54A-N can process the thermographic image data (using commands from a command library), and communicate the thermographic image data back to computers 60A-N and/or viewing stations 68A-N (viewing stations 68A-N can be one of computers 60A-N). In any event, the requested thermographic images will be reconstructed and displayed for a user. Thermographic image request and display is made more efficient and easier hereunder due to the fact that the functions described are implemented over a network as shown in FIG. 4. Among other things, this shows that thermographic image request and viewing need not occur at a fixed station, rather can occur via and a computer that is capable of communicating on network.

Figure 5:
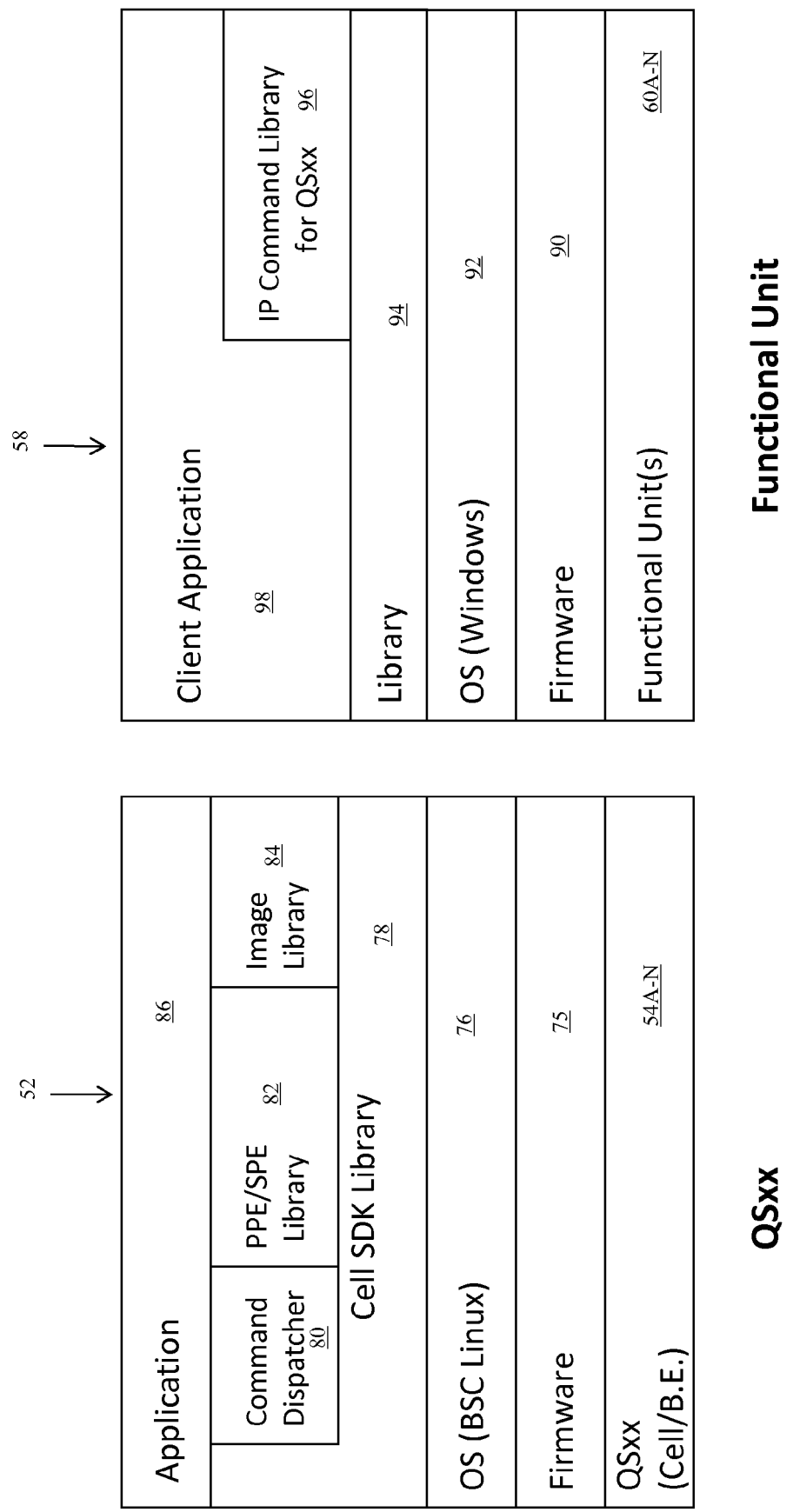
FIG. 5 shows a software layer diagram according to the present invention.

Referring to FIG. 5, a software layer view of the present invention is shown. As depicted, thermographic image processing unit includes set of thermographic image processors 54A-N, firmware 75, a universal operating system 76, a cell SDK library 78 containing commands for processing thermographic image data, a command dispatcher 80 for issuing instructions based on the commands, a special purpose engine library 82 for processing the thermographic image data, an thermographic image library 84, and an application 86. The thermographic image interface unit 58 comprises functional units 60A-N, firmware 90, operating system 92, library 94, IP command library 96, and client application 98.

II. Computerized Implementation

Figure 6:
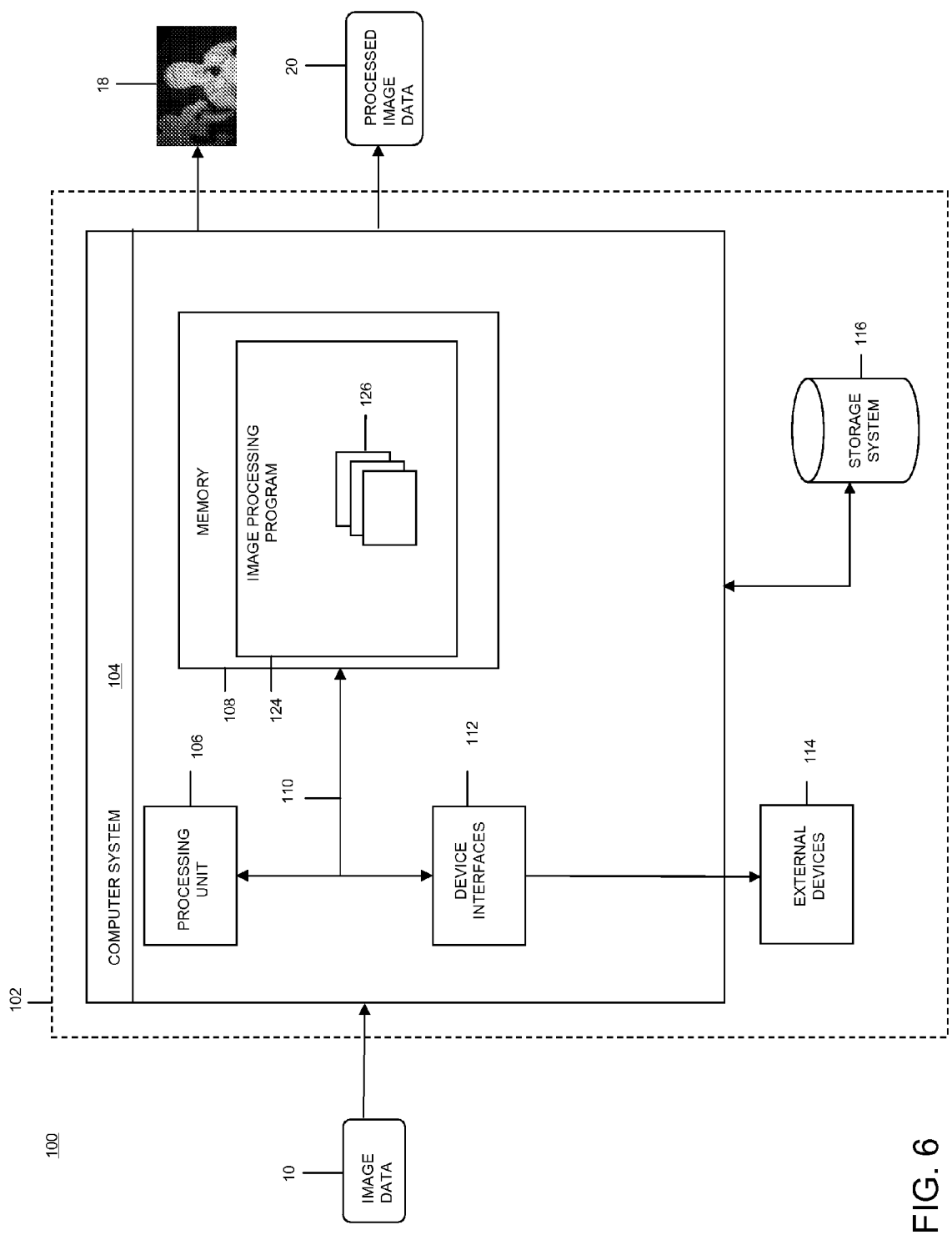
FIG. 6 shows a more specific computerized implementation according to the present invention.

Referring now to FIG. 6, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

Computer system is intended to represent any type of computer system that may be implemented in deploying/realizing the teachings recited herein. In this particular example, computer system 104 represents an illustrative system that could utilized within thermographic image processing unit 52. It should be understood that any other computers implemented (e.g., computer stations 60A-N, viewing stations 68A-N) under the present invention will have similar components, but may perform different functions/have different software. As shown, computer system 104 includes a processing unit 106, a memory 108, a bus 110, and device interfaces 112. Further, computer system 104 is shown communicating with one or more external devices that communicate with bus via device interfaces. In general, processing unit 106 executes computer program code, such as thermographic image processing program 124, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices. Although not shown, computer system 104 could contain multiple processing units.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system 104.

Storage system 116 can be any type of system (e.g., storage units 70A-N of FIG. 3) capable of providing storage for information under the present invention. To this extent, storage system 116 could include one or more storage devices such as magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is thermographic image processing program 124, which has a set of modules 126. Set of modules 126 generally provide the functions of the present invention as described herein. Specifically (among other things), set of modules 26 is configured to: receive thermographic image data 150 on a set of interconnected computers from a set of thermographic image capture devices; pre-filter thermographic image data 10; store the thermographic image data in at least one storage device; receive a request for the thermographic image data from an thermographic image processor; send the thermographic image data to a thermographic image processor in response to the request; process the thermographic image data with the thermographic image processor to yield processed thermographic image data 12; generate reconstructed thermographic image data 14; return a response such as processed thermographic image data; to a sender of the request, the response being based on the processing; receive a query of thermographic image data from the set of computers, prior to the request; provide thermographic image 18 based on the processed thermographic image data 12 and reconstructed thermographic image data 14.

While shown and described herein as thermographic image processing system, it is understood that the invention further provides various alternative embodiments. For example, in one embodiment, the invention provides a computer-readable/useable medium that includes computer program code to enable a computer infrastructure to provide thermographic image processing. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide thermographic image processing. In this case, the service provider can create, maintain, support, etc., a computer infrastructure, such as computer infrastructure 102 (FIG. 6) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for thermographic image processing. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A method for processing thermographic images, comprising:
receiving a query corresponding to a set of thermographic images;
receiving a request for at least one of the set of thermographic images, the request being based on a result of the query;
retrieving thermographic image data corresponding to the at least one of the set of thermographic images from storage, wherein the thermographic image data is retrieved from a thermographic image interface unit prior to the query;

processing the thermographic image data with a thermographic image processor; and returning a response to the request, the response being based on the thermographic image data after the thermographic image data has been processed.

2. The method of claim 1, further comprising reconstructing the at least one of the set of thermographic images.

3. The method of claim 1, the query and the request being received from at least one of a set of interconnected computers, and the response being returned to the at least one of the set of interconnected computers.

4. The method of claim 1, the thermographic image processor being a multi-core thermographic image processor.

5. The method of claim 1, the thermographic image interface unit receiving the thermographic image data via a set of thermographic image grabbers.

6. The method of claim 1, further comprising analyzing the thermographic image data after the processing.

7. A system for processing thermographic images, comprising:
- a module for receiving a query corresponding to a set of thermographic images;
- a module for receiving a request for at least one of the set of thermographic images, the request being based on results of the query;
- a module for retrieving thermographic image data corresponding to the at least one of the set of thermographic images from storage in response to the request;
- a module for processing the thermographic image data with a thermographic image processor;
- a module for returning a response to the request, the response being based on the thermographic image data after the thermographic image data has been processed; and
- a module for receiving the thermographic image data from a thermographic image interface unit prior to the query.

8. The system of claim 7, further comprising a module for reconstructing the at least one of the set of thermographic images using the thermographic image data after the thermographic image data has been processed, the response comprising reconstructed thermographic images.

9. The system of claim 7, the query and the request being received from at least one the set of interconnected computers, and the response being returned to the at least one of the set of interconnected computers.

10. The system of claim 7, the thermographic image processor being a multi-core thermographic image processor.

11. The system of claim 7, the thermographic image interface unit comprising a set of thermographic image grabbers for receiving the thermographic image data from a set of thermographic image recordation mechanisms.

12. The system of claim 7, further comprising a module for analyzing the thermographic image data after the thermographic image data has been processed.

13. At least one computer readable storage device containing at least one program product for processing thermographic images, the at least one computer readable medium comprising program code for causing at least one computer system to:
- receive a query corresponding to a set of thermographic images;
- receive a request for at least one of the set of thermographic images, the request being based on results of the query;
- retrieve thermographic image data corresponding to the at least one of the set of thermographic images from storage in response to the request, wherein the thermographic image data is received from a thermographic image interface unit prior to the query;
- process the thermographic image data with a thermographic image processor; and
- return a response to the request, the response being based on the thermographic image data after the thermographic image data has been processed.

14. The at least one computer readable storage device containing the at least one program product of claim 13, the at least one computer readable medium further comprising program code for causing the at least one computer system to reconstruct the at least one of the set of thermographic images using the thermographic image data.

15. The at least one computer readable storage device containing the at least one program product of claim 13, the query and the request being received from at least one the set of interconnected computers, and the response being returned to the at least one of the set of interconnected computers.

16. The at least one computer readable storage device containing the at least one program product of claim 13, the thermographic image processor being a multi-core thermographic image processor.

17. The at least one computer readable storage device containing the at least one program product of claim 13, the thermographic image interface unit comprising a set of thermographic image grabbers for receiving the thermographic image data from a set of thermographic image recordation mechanisms.

18. The at least one computer readable storage device containing the at least one program product of claim 13, the at least one computer readable medium further comprising program code for causing the at least one computer system to analyze the thermographic image data after the thermographic image data has been processed.

19. A method for deploying at least one application for processing thermographic images, comprising;
providing a computer infrastructure being operable to:
- receive a query corresponding to a set of thermographic images;
- receive a request for at least one of the set of thermographic thermographic images, the request being based on results of the query;
- retrieve thermographic image data corresponding to the at least one of the set of thermographic images from storage in response to the request, wherein the thermographic image data is retrieved from a thermographic image interface unit prior to the query;
- process the thermographic image data with a thermographic image processor; and
- return a response to the request, the response being based on the thermographic image data after the thermographic image data has been processed.

20. The method of claim 19, the computer infrastructure being further operable to reconstruct the at least one of the set of thermographic images using the thermographic image data.

* * * * *